June 2, 1931. J. L. BROWNELL 1,807,960
ADJUSTABLE SEAT
Filed May 19, 1930
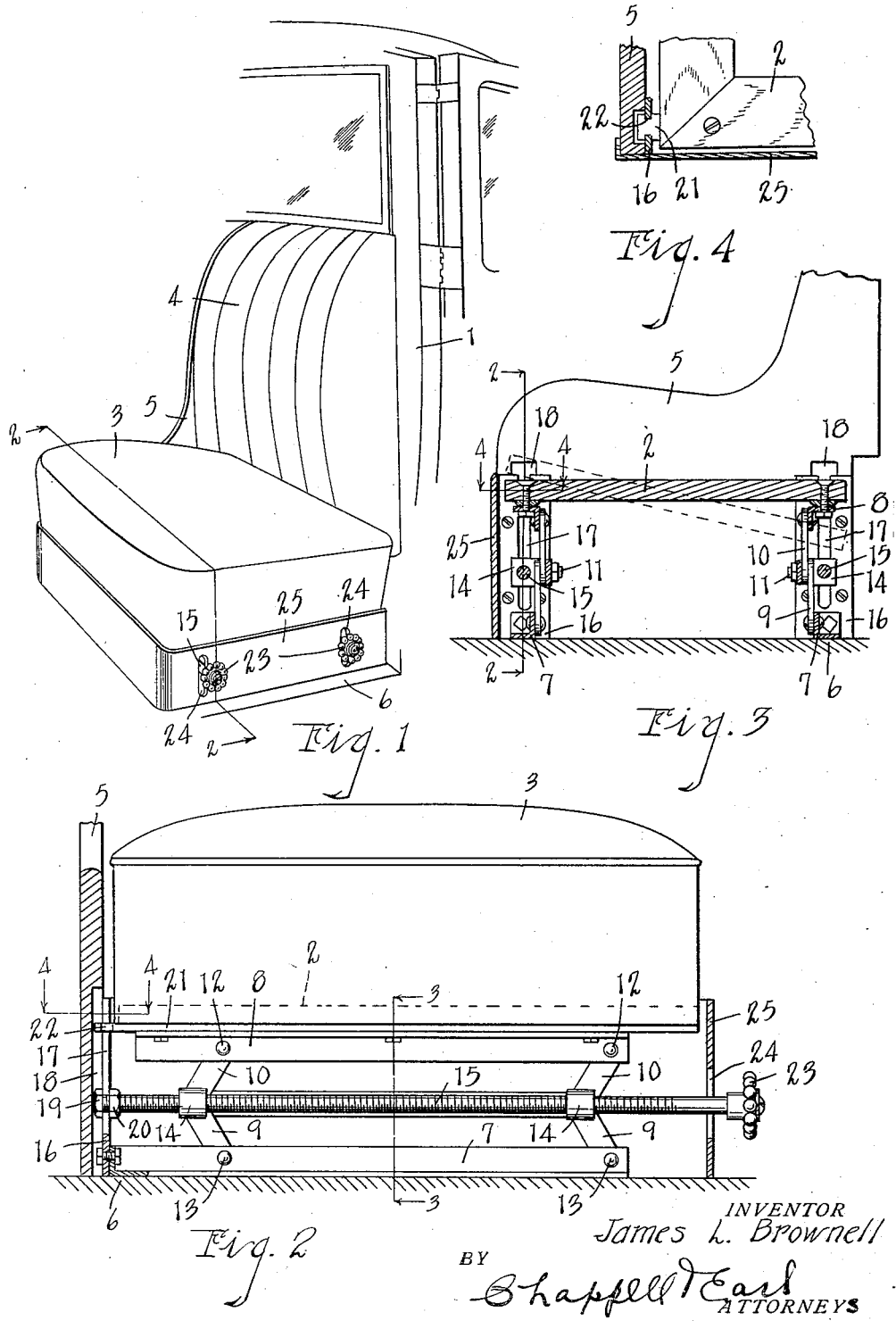
INVENTOR
James L. Brownell
BY
Chappell & Earl
ATTORNEYS Patented June 2, 1931

1,807,960

UNITED STATES PATENT OFFICE

JAMES L. BROWNELL, OF KALAMAZOO, MICHIGAN, ASSIGNOR TO CHECKER CAB MANUFACTURING CORPORATION, OF KALAMAZOO, MICHIGAN

ADJUSTABLE SEAT

Application filed May 19, 1930. Serial No. 453,571.

The main object of this invention is to provide an adjustable seat which is particularly well adapted for motor vehicles, by means of which the height of the seat may be quickly adjusted, and one which enables the tilting adjustment also.

A further object is to provide a structure having these advantages which, while simple and economical in structure, is strong and rigid and requires no locking means for retaining it in its adjusted position.

Objects pertaining to details and economies of my invention will definitely appear from the description to follow. The invention is defined in the claims.

A structure embodying the features of my invention is clearly illustrated in the accompanying drawings, in which:

Fig. 1 is a fragmentary perspective view of a motor vehicle of the taxicab type illustrating my invention as embodied in the driver's seat.

Fig. 2 is a fragmentary view partially in vertical section on line 2—2 of Figs. 1 and 3.

Fig. 3 is a fragmentary view partially in vertical section on line 3—3 of Fig. 2.

Fig. 4 is a detail section on line 4—4 of Figs. 2 and 3.

Referring to the drawings, 1 represents the body of a motor vehicle of the taxicab type. The driver's seat 2 is provided with a cushion 3, the details of which are not illustrated. The back cushion 4 is supported in operative relation to the seat but the details of this support form no part of my present invention. At the inner side of the seat is the usual wall 5. 6 represents the front of the vehicle.

The adjustable support for the seat comprises base bars 7, preferably of angle iron, which are mounted upon the floor of the vehicle in spaced relation transversely of the seat. Similar bars 8, also preferably of angle iron, are mounted on the under side of the seat adjacent its front and rear edges and in substantial alinement with the base bars 7.

Coacting pairs of toggle links 9 and 10 are pivotally connected by pivots 11. The upper links are connected to the bars 8 by means of the pivots 12 while the lower links are connected to the bars 9 by means of the pivots 13. Nuts or blocks 14 are connected to the pivots 11 and are engaged by the adjusting screws 15.

At the inner ends of the bars are uprights 16 having vertical slots 17 therein. These uprights are secured to the base bar 7 and also to the partition wall 5 which has recesses 18 therein. The screws are arranged through the slots 17 and provided with spaced nuts 19 and 20. These nuts are not in clamping engagement with the uprights but permit rotative and vertical movement of the screws in the uprights, the uprights, however, sustaining the end thrust or load on the screws.

To prevent swaying of the seat and to guide the same in its vertical travel, I provide guide members 21 which are secured to the under side of the seat and notched at 22 to engage the uprights, thereby guiding the seat and preventing lateral swaying thereof so that when the screws are rotated the seat is raised and lowered. The screws are provided with handwheels 23 at their outer ends.

The screws project through slots 24 in the housing 25 which is disposed to extend at least along the front and the outer side of the seat. This housing wall conceals the adjusting mechanism. The screws may be independently adjusted, thereby tilting the seat as desired, a considerable range of adjustment being possible.

It is found in practice that, while the parts are thrown somewhat out of alinement in this tilting adjustment, there is sufficient looseness in the joints and spring in the links to permit this, and special provision for this tilting is not necessary.

I have illustrated and described my improvements in an embodiment which I have found highly practical. I have not attempted to illustrate and describe various embodiments and adaptations possible as it is believed that this disclosure will enable those skilled in the art to embody or adapt the same as may be desired.

Having thus described my invention what I claim as new and desire to secure by Letters Patent is:

1. In combination with a seat, of a pair of spaced base members disposed transversely of the seat, bars mounted on the seat in vertical alinement with said base members, spaced vertically slotted uprights at one end of said base members, notched guide members on said seat slidably engaged in the slots in said uprights, pairs of seat supporting links pivotally connected to each other, one link of each pair being connected to said base members and the other to said bars on said seat, the link connecting pivots having threaded members connected thereto, adjusting screws having rotative and sliding engagement with said slots of said uprights and threaded engagement with said threaded members of said link pivots, said screws being provided with hand pieces at their outer ends, and a housing having a wall opposite said uprights vertically slotted to receive said screws.

2. The combination with a seat, of a pair of spaced base members disposed transversely of the seat, bars mounted on the seat in vertical alinement with said base members, spaced vertically slotted uprights at one end of said base members, notched guide members on said seat slidably engaged in the slots in said uprights, pairs of seat supporting links pivotally connected to each other, one link of each pair being connected to said base members and the other to said bars on said seat, the link connecting pivots having threaded members connected thereto, and adjusting screws having rotative and sliding engagement with said slots of said uprights and threaded engagement with said threaded members of said link pivots.

3. The combination with a seat, of front and rear supports for said seat, each comprising a pair of pivotally connected links, one link of each pair being pivotally connected to the seat and the other to a supporting element, adjusting screws having threaded connection with the connecting pivots of said links, and supports with which said screws are connected for rotative and vertical movement, said seat also having vertical sliding connection with said supports.

4. The combination with a seat, of front and rear supports for said seat, each comprising a pair of pivotally connected links, one link of each pair being pivotally connected to the seat and the other to a supporting element, adjusting screws having threaded connection with the connecting pivots of said links, and supports with which said screws are connected for rotative and vertical movement.

5. The combination with a seat, of front and rear pairs of supporting toggles for said seat, slotted uprights, said seat being provided with guide members engaging the slots of said uprights, and adjusting screws for said toggles rotatably and slidably engaged with the slots of said uprights and having threaded engagement with said toggles.

6. The combination with a seat, of front and rear pairs of supporting toggles for said seat, slotted uprights, and adjusting screws for said toggles rotatably and slidably engaged with the slots of said uprights and having threaded engagement with said toggles.

In witness whereof I have hereunto set my hand.

JAMES L. BROWNELL.